United States Patent [19]
Rabbani

[11] Patent Number: 5,568,570
[45] Date of Patent: Oct. 22, 1996

[54] METHOD AND APPARATUS FOR REDUCING QUANTIZATION ARTIFACTS IN A HIERARCHICAL IMAGE STORAGE AND RETRIEVAL SYSTEM

[75] Inventor: Majid Rabbani, Pittsford, N.Y.

[73] Assignee: Eastman Kodak Company, Rochester, N.Y.

[21] Appl. No.: 315,781

[22] Filed: Sep. 30, 1994

[51] Int. Cl.$^6$ .................................................. G06K 9/00
[52] U.S. Cl. ....................... 382/238; 348/394; 358/428; 382/252
[58] Field of Search ................................. 382/251, 252, 382/275, 239, 240, 309, 238; 348/418, 419, 408, 405, 417, 414, 394; 358/428

[56] References Cited

U.S. PATENT DOCUMENTS

| | | | |
|---|---|---|---|
| 4,751,742 | 6/1988 | Meeker | 382/41 |
| 4,816,322 | 3/1989 | Pickering | 428/199 |
| 4,849,810 | 7/1989 | Ericsson | 358/133 |
| 5,050,230 | 9/1991 | Jones et al. | 382/56 |
| 5,341,429 | 8/1994 | Stringer et al. | 380/23 |
| 5,412,427 | 5/1995 | Rabbani et al. | 348/394 |
| 5,442,458 | 8/1995 | Rabbani et al. | 358/426 |

*Primary Examiner*—Leo Boudreau
*Assistant Examiner*—Bijan Tadayon
*Attorney, Agent, or Firm*—Peyton C. Watkins

[57] ABSTRACT

The system and method reduces the quantization artifacts in the addition and removal of a digital watermark to and from a selected resolution image of a hierarchical image storage system where the watermark removal record is placed in a higher resolution image component. For those applications where preserving the image quality of a higher resolution image component is more critical than preserving the image quality of a lower resolution image component, the low-resolution image is modified according to the teachings of the present invention to minimize and in many cases eliminate the quantization artifacts at the higher resolution component.

14 Claims, 14 Drawing Sheets

| 70 | 72 | 74 | 70 | 66 | 133 | 200 | 200 | 200 |
|---|---|---|---|---|---|---|---|---|
| 65 | 66 | 68 | 67 | 67 | 133 | 200 | 200 | 200 |
| 60 | 61 | 62 | 65 | 68 | 134 | 200 | 200 | 200 |
| 61 | 62 | 63 | 66 | 69 | 134 | 200 | 200 | 200 |
| 62 | 63 | 65 | 67 | 70 | 135 | 200 | 200 | 200 |
| 131 | 132 | 132 | 134 | 135 | 167 | 200 | 200 | 200 |
| 200 | 200 | 200 | 200 | 200 | 200 | 200 | 200 | 200 |
| 200 | 200 | 200 | 200 | 200 | 200 | 200 | 200 | 200 |
| 200 | 200 | 200 | 200 | 200 | 200 | 200 | 200 | 200 |

| +1 | +4 | 0 | 0 | +1 | -63 | -130 | -132 | -132 |
|---|---|---|---|---|---|---|---|---|
| +3 | +6 | +4 | +2 | +1 | -58 | -141 | -150 | -145 |
| 0 | +1 | +2 | -1 | 0 | -62 | -130 | -129 | -128 |
| 0 | +4 | +2 | 0 | 0 | -60 | -132 | -129 | -128 |
| +2 | +4 | +1 | 0 | 0 | -66 | -136 | -130 | -132 |
| -67 | -65 | -66 | -67 | -63 | -94 | -128 | -127 | -131 |
| -134 | -135 | -138 | -133 | -132 | -130 | -130 | -132 | -134 |
| -133 | -131 | -133 | -131 | -131 | -127 | -129 | -132 | -136 |
| -137 | -138 | -135 | -134 | -135 | -131 | -132 | -134 | -138 |

FIG. 8

| +1 | +4 | 0 | 0 | +1 | -48 | -48 | -48 | -48 |
|---|---|---|---|---|---|---|---|---|
| +3 | +6 | +4 | +2 | +1 | -48 | -48 | -48 | -48 |
| 0 | +1 | +2 | -1 | 0 | -48 | -48 | -48 | -48 |
| 0 | +4 | +2 | 0 | 0 | -48 | -48 | -48 | -48 |
| +2 | +4 | +1 | 0 | 0 | -48 | -48 | -48 | -48 |
| -48 | -48 | -48 | -48 | -48 | -48 | -48 | -48 | -48 |
| -48 | -48 | -48 | -48 | -48 | -48 | -48 | -48 | -48 |
| -48 | -48 | -48 | -48 | -48 | -48 | -48 | -48 | -48 |
| -48 | -48 | -48 | -48 | -48 | -48 | -48 | -48 | -48 |

FIG. 9

| QUANTIZER INPUT RANGE | QUANTIZED VALUE |
|---|---|
| -47 TO -255 | -48 |
| -44,-45,-46 | -45 |
| -41,-42,-43 | -42 |
| -38,-39,-40 | -39 |
| -35,-36,-37 | -36 |
| -32,-33,-34 | -33 |
| -29,-30,-31 | -30 |
| -26,-27,-28 | -27 |
| -24,-25 | -24 |
| -22,-23 | -22 |
| -20,-21 | -20 |
| -18,-19 | -18 |
| -16,-17 | -16 |
| -14,-15 | -14 |
| -12,-13 | -12 |
| -10,-11 | -10 |
| -8,-9 | -8 |
| -6,-7 | -6 |
| -5 | -5 |
| -4 | -4 |
| -3 | -3 |
| -2 | -2 |
| -1 | -1 |
| 0 | 0 |
| 1 | 1 |
| 2 | 2 |
| 3 | 3 |
| 4 | 4 |
| 5 | 5 |
| 6,7 | 6 |
| 8,9 | 8 |
| 10,11 | 10 |
| 12,13 | 12 |
| 14,15 | 14 |
| 16,17 | 16 |
| 18,19 | 18 |
| 20,21 | 20 |
| 22,23 | 22 |
| 24,25 | 24 |
| 26,27,28 | 27 |
| 29,30,31 | 30 |
| 32,33,34 | 33 |
| 35,36,37 | 36 |
| 38,39,40 | 39 |
| 41,42,43 | 42 |
| 44 TO 255 | 45 |

FIG. 10

| 71 | 76 | 74 | 70 | 67 | _85_ | _152_ | _152_ | _152_ |
|----|----|----|----|----|------|-------|-------|-------|
| 68 | 72 | 72 | 69 | 68 | _85_ | _152_ | _152_ | _152_ |
| 60 | 62 | 64 | 64 | 68 | _86_ | _152_ | _152_ | _152_ |
| 61 | 66 | 65 | 66 | 69 | _86_ | _152_ | _152_ | _152_ |
| 64 | 67 | 66 | 67 | 70 | _87_ | _152_ | _152_ | _152_ |
| _83_ | _84_ | _84_ | _86_ | _87_ | _119_ | _152_ | _152_ | _152_ |
| _152_ | _152_ | _152_ | _152_ | _152_ | _152_ | _152_ | _152_ | _152_ |
| _152_ | _152_ | _152_ | _152_ | _152_ | _152_ | _152_ | _152_ | _152_ |
| _152_ | _152_ | _152_ | _152_ | _152_ | _152_ | _152_ | _152_ | _152_ |

METHOD AND APPARATUS FOR REDUCING QUANTIZATION ARTIFACTS IN A HIERARCHICAL IMAGE STORAGE AND RETRIEVAL SYSTEM

CROSS-REFERENCE TO RELATED APPLICATIONS

The present application is related to U.S. patent application Ser. No. 08/146,371 entitled "Method And Apparatus For The Addition And Removal Of Digital Watermarks In A Hierarchical Image Storage And Retrieval System", filed on Oct. 29, 1993, by Rabbani et al., now abandoned.

FIELD OF THE INVENTION

The present invention is related to the field of digital image processing and more particularly to methods and associated apparatus for reducing quantization artifacts in a hierarchical image storage and retrieval system that employs the quantization of residual image components.

BACKGROUND OF THE INVENTION

Image pyramids provide an efficient means for the storage and retrieval of digital images at various resolutions. It is customary in such hierarchical image storage and retrieval systems to construct a multiple of image resolutions by repeatedly filtering and subsampling a high resolution image using a scheme similar to the teachings found in the patent to Melnychuck and Jones (U.S. Pat. No. 4,969,204). In such cases, the higher resolution components are usually stored in the form of quantized residuals that are entropy encoded to save storage space. In the context of the present invention, we will make reference to one such system, namely the Kodak Photo CD system, as an example to demonstrate the fundamental concepts underlying the invention. However, it should be noted that this example is only used to give the reader an insight as to the operation of one or more embodiments of the invention with the understanding that other hierarchical image storage and retrieval systems with other resolutions or arrangements that store the high resolution components as residuals may be chosen to suit specific needs without detracting from the teachings of the present invention.

The Kodak Photo CD system is composed of an image hierarchy or pyramid in which the highest resolution image contains 3072×2048 pixels and is referred to as the 16BASE image. This resolution is in most cases adequate to produce photographic quality originals on an appropriate digital output device. The next level of hierarchy, referred to as the 4BASE, is composed of 1536×1024 pixels and is adequate to generate a high quality HDTV display, or a small-sized photographic quality print on an appropriate digital output device. The lower resolution levels are, respectively, the BASE image consisting of 768×512 pixels (suitable for NTSC/PAL/SECAM television viewing), the BASE/4 image consisting of 384×256 pixels (suitable for sub-NTSC displays), and the BASE/16 consisting of 192×128 pixels (suitable for displaying thumbnail images). The complete image hierarchy is constructed from the 16BASE image using the teachings found in the #204 patent to Melnychuck and Jones previously cited. The BASE/16, BASE/4, and the BASE images are stored onto a digital storage medium such as a CD in uncompressed form while the 4BASE and 16BASE images are represented as residuals and are quantized and compressed by using entropy coding prior to their storage on the CD.

A quantizer is a many-to-one mapping and, as such, the quantized data often contains degradations compared to the original unquantized data. The degradations can be particularly significant when the input data has a distribution (histogram) containing long tails, as those values are clipped to the outermost quantization level. In a hierarchical imaging system such as the Kodak Photo CD system, the residual image usually has a symmetric distribution with a high peak and decaying tails, sometimes approximated by a Laplacian (two-sided exponential) distribution. The minimum-mean-squared-error quantizer that accommodates such a distribution contains dense inner level (in the region where the signal peaks) and sparse outer level (around the tails). An example of how a quantizer processes treats signal values is shown in the table of FIG. 10. It is based on the principal that by introducing a larger error in those values where the signal occurs infrequently and a smaller error at values where it occurs more frequently, the overall average error can be minimized.

As described in the teachings of the previously cited patent to Melnychuck and Jones, the construction of a high-resolution image is accomplished by adding the quantized residual to the interpolated low-resolution component from the previous stage. Thus, the error resulting from the quantization of the residual is propagated to the higher-resolution images. Although the residuals with large magnitudes occur infrequently, it should be noted that they often represent high-contrast edges or details in an image, and the introduction of a large quantization error can create an annoying visual artifact or loss of detail in the high-resolution image. One of the objectives of the present invention is to introduce a method whereby the low-resolution image whose image quality is less critical can be modified in order to minimize the quantization errors in the high-resolution image.

The aforementioned hierarchical storage technique is combinable with the insertion and removal of a digital watermark according to the teachings of the cited Rabbani et al., application to form a distributed image system. In a distributed image system it is common to deliver an image of compromised image quality for the purposes of browsing or proofing. The compromise can be made with the use of a removable watermark. Primary use of such a system is by professional portrait photographers who distribute a plurality of images to a customer for selection and approval. The watermark is a form of graphic overlay that may contain a copyright notice or information regarding the restricted use of the image.

Upon selection of the desired image by the customer, the professional delivers a high quality rendition of the image either digitally or in hard copy form without the watermark. At all times the professional possesses the sole means of generating and delivering unmarked high quality images. In a conventional photographic system the means for generating would be the original negatives of the images; in a digital hierarchical system according to the invention of Rabbani et al., the means for generating are higher resolution residual components.

In a digital imaging system, and in particular one that includes a hierarchical form of digital storage and retrieval, the professional may use a suitable digital storage medium such as a CD for the distribution of proofs. In an unrestricted environment, the customer may choose a desired image resolution from the hierarchy for the purposes of browsing, proofing, or hard copy fulfillment. In those instances where it is desirable for the professional to deliver the digital storage medium containing the entire image hierarchy to the customer, it is also most economical to record the entire image hierarchy once onto the digital storage medium and avoid having to make a second copy containing only low resolution components for distribution. However, it is also desirable to restrict the use of selected high resolution components for the purpose of full image quality fulfillment until payment has been received.

The invention of the Rabbani et al. application, previously referenced, teaches a method whereby the professional places a digital watermark on a selected image component. The removal of the watermark is done through an additional image component containing the reverse of the watermark. The customer, having possession of the CD storage medium, would possess the means for generating his own high quality hard copy when authorized by the professional.

When a watermark is applied to a low-resolution image, the pixel values in that region of the low-resolution image affected by the watermark can become completely different from the pixel values in the high-resolution image corresponding to the same region. As a result, in those regions, the difference between the interpolated watermarked image and the high-resolution image can become fairly large which, given the nature of the quantizer, can result in large quantization errors. These errors often appear as a visual trace of the watermark in the high-resolution image and significantly impair the visual quality of the high-resolution image. Minimization of such errors is addressed by the present invention.

SUMMARY OF THE INVENTION

One embodiment of the present invention is a method for reducing quantization artifacts in a hierarchical image system of the type that decomposes a high resolution image into low resolution image components, including low resolution image pixel values, and residual image pixel values comprising the steps of::

a) forming a predicted higher resolution image by interpolating the pixel values of the low resolution image components;

b) determining the difference values between the pixel values in the low resolution image and the corresponding pixel values in the higher resolution image;

c) comparing each of the difference values against quantizer conversion values to determine if an error would exist for an executed conversion;

d) adjusting the image pixel values within the low resolution image component if an error would exist, to a value that eliminates the error to form an adjusted low resolution image; and e) using the unadjusted image pixel values as part of the adjusted low resolution image component if an error does not exist.

Another embodiment of the present invention is a method for reducing quantization artifacts in a hierarchical image system of the type that decomposes a high resolution image into low resolution image pixel values and residual image pixel values and applies a watermark to the low resolution image pixel values comprising the steps of:

a) applying watermark pixel values to pixel positions within the low resolution image to form a watermarked low resolution image component;

b) determining the difference values between the pixel values in the watermarked low resolution image and the corresponding pixel values in the higher resolution image;

c) comparing each of the difference values against quantizer conversion values to determine if an error would exist for an executed conversion;

d) adjusting the watermark image pixel values within the watermarked low resolution image component if an error would exist, to a value that eliminates the error to form an adjusted watermarked low resolution image; and e) using the watermark image pixel value as part of the adjusted watermarked low resolution image component if an error does not exist.

From the foregoing it can be seen that it is a preferred object of the present invention to provide a method and associated apparatus for improving the quality of a high-resolution image component by modifying a lower-resolution image component whose image quality is less critical.

It is another object of the present invention to improve the quality of a high-resolution image component by modifying a lower-resolution image component whose image quality is less critical when a watermark is inserted and removed.

Yet another object of the present invention is the reduction of quantization artifacts in the addition and removal of a digital watermark to and from a selected resolution image where the watermark removal record is placed in a higher resolution image component.

The above and other objects of the present invention will become more apparent when taken in conjunction with the following description and drawings wherein like characters indicate like parts and which drawings form a part of the present invention.

BRIEF DESCRIPTION OF THE DRAWINGS

FIG. 3 is an example of the brightness component of a BASE image in pixel value form.

FIG. 4 is an example of a watermarked BASE image in pixel value form.

FIG. 5 is an example of the pixel values of a 4BASE image corresponding to the pixel values of the BASE image of FIG. 3.

FIG. 8 illustrates the pixel values of a residual image formed as the difference between the images in FIGS. 5 and 7.

FIG. 9 illustrates the pixel values of the residual image of FIG. 8 after quantization.

FIG. 10 illustrates, in table form, the quantizer input-output characteristics used in generating the quantized residual image pixel values of FIG. 9.

FIG. 11 illustrates the pixel values of the reconstructed 4BASE image using the PRIOR ART schemes of FIGS. 1 and 2.

DETAILED DESCRIPTION OF THE INVENTION

The present invention generally addresses the potential problem of artifact generation in a high resolution image caused by the quantization of residuals. One example is when the high resolution image contains high contrast edges or areas of detail that can give rise to a large residual value. Consequently, the quantization or clipping of this residual value can degrade the quality of the high resolution image reconstructed from this residual.

Another example is when a watermark is inserted into the low resolution image. In this case, the pixel values in that region of the low-resolution image affected by the watermark can become completely different from the pixel values in the high-resolution image corresponding to the same region, thus resulting in large residual values. The error resulting from the quantization of such large residual values often appears as a visual trace of the watermark in the high-resolution image.

Figure 1:
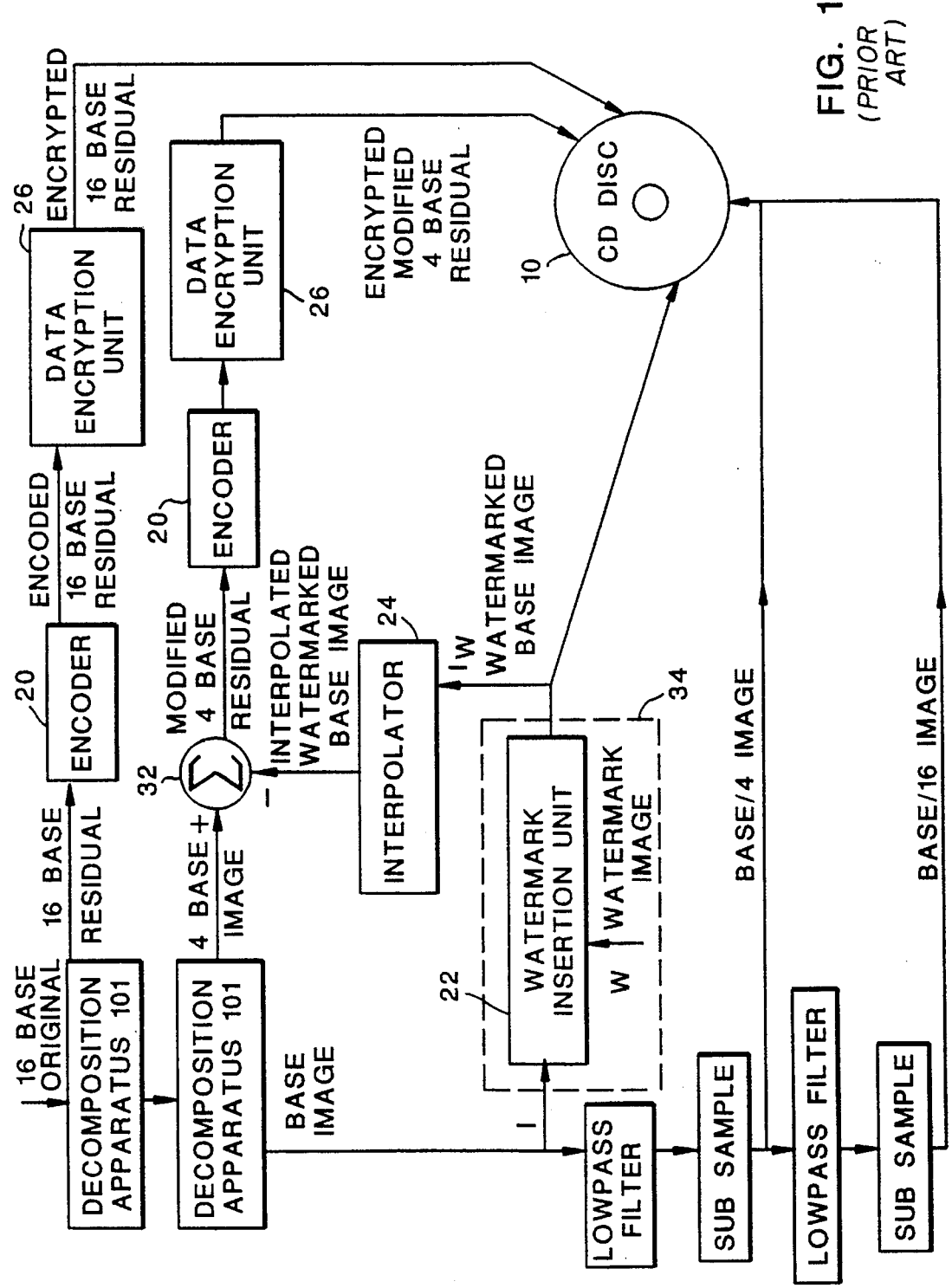
FIG. 1 illustrates, in block diagram form, a PRIOR ART hierarchical image decomposition scheme combined with a scheme for inserting a digital watermark in a low-resolution image component and placing a watermark removal component in a high-resolution residual.

A PRIOR ART watermark system arrangement is illustrated in FIG. 1. This arrangement is the same as the arrangement illustrated in FIG. 2 of U.S. patent application Ser. No. 146,371, referenced above. In Box 34, a watermark W is first inserted in the BASE image I to arrive at a watermarked BASE image $I_W$. This watermarked BASE image is then interpolated to the size of the 4BASE image in interpolator 24 using linear interpolation. A difference is formed between the original 4BASE image taken from the output of a decomposition apparatus 101 and the interpolated watermarked BASE image in subtracter 32 to form a modified 4BASE residual that serves as the watermark removal record. This modified 4BASE residual is encoded by encoder 20, encrypted in encryption unit 26 and stored on a CD storage medium 10 along with the watermarked BASE image $I_W$ in unencrypted form in addition to the original unencrypted BASE/4 and BASE/16 images. Additionally, a 16 BASE residual is formed and added to the CD storage medium 10. Note that except for a negligible increase in the size of the compressed 4BASE residual, there are no additional memory requirements since the watermark removal component is embedded in the 4BASE residual.

Throughout this description of the invention reference is made to the forming, merging, or differencing of images. It is understood by those skilled in the art that the pixel values representing images are manipulated, not the images themselves.

Figure 2:
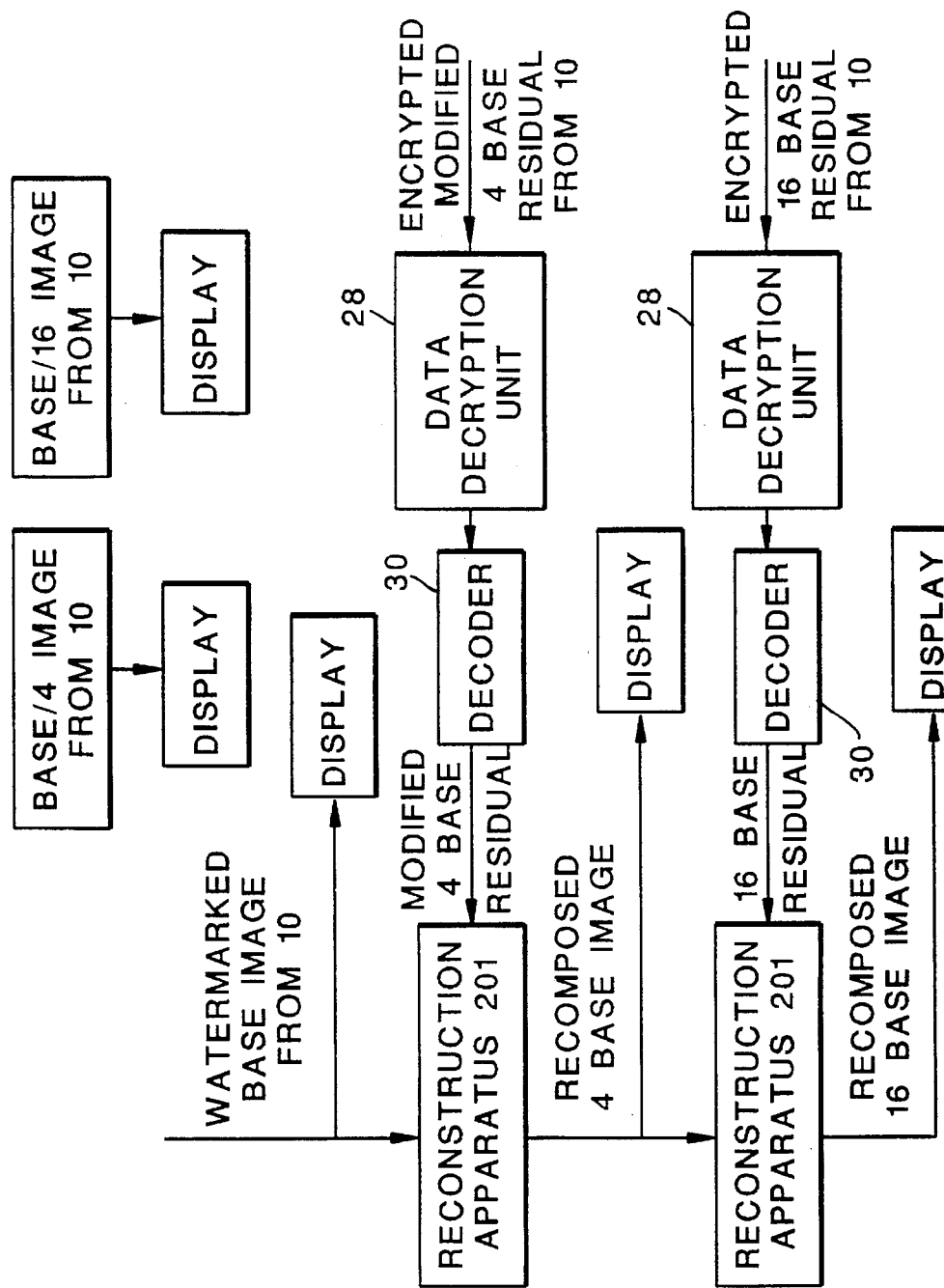
FIG. 2 illustrates, in block diagram form, a PRIOR ART hierarchical image reconstruction scheme for recovering a high-resolution image that has been decomposed by the scheme illustrated in FIG. 1.

For browsing or proofing, the PRIOR ART system of FIG. 2 is employed. The PRIOR ART system arrangement of FIG. 2 is substantially the same as the arrangement illustrated in FIG. 3 of U.S. patent application Ser. No. 146,371, referenced above. The user retrieves the BASE/16, BASE/4, or watermarked BASE images directly without decryption from the CD storage medium 10. Upon authorization, the user inputs a decryption key to the data decryption unit 28 to decrypt the modified 4BASE residual. The watermarked BASE image is decoded in decoder 30 and interpolated using linear interpolation and is added to the decrypted modified 4BASE residual in the reconstruction apparatus 201 to recover the 4BASE image. Details of the reconstruction apparatus 201 can be obtained from FIG. 2, and the associated description found in U.S. Pat. No. 4,969,204. In general, if the modified 4BASE residual is quantized prior to its storage on the CD 10 (which is usually the case), the exact 4BASE image cannot be recovered. The discrepancy between the original 4BASE image and the 4BASE image recovered according to the above procedure depends on the coarseness of the quantizer in addition to the nature of the watermark. The quantizers used in the PRIOR ART systems of FIGS. 1 and 2 are part of the encoders 20

The description of the problem encountered with the PRIOR ART systems of FIGS. 1 and 2 can be clarified by using an example. Assuming that an image is represented by a two-dimensional array of pixels with the pixels being represented by numbers with indices (i,j) denoting the location of a pixel at the ith row and the jth column, where i=1, . . . ,$N_1$, and j=1, . . . ,$N_p$, and $N_1$ and $N_p$ are, respectively, the number of the lines and the number of pixels per line in the image, and that the brightness of each pixel is represented by an 8-bit number, i.e., a number in the range of 0 to 255. Now consider an example where, for the purpose of simplicity, a low-resolution image, hereafter referred to as the BASE image, is composed of a 5×5 array of pixels as illustrated in FIG. 3. Referring to Box 34 in FIG. 1, a watermark W is added to this image to create the watermarked BASE image of FIG. 4. The dotted line in FIG. 4 shows the region affected by the watermark. In this example, the effect of the watermark is to replace the value of the pixels overlaid by the watermark W by a uniform brightness value of 200 so as to create a high contrast between the watermark area and the remaining pixels in the BASE image.

Figures 6, 7:
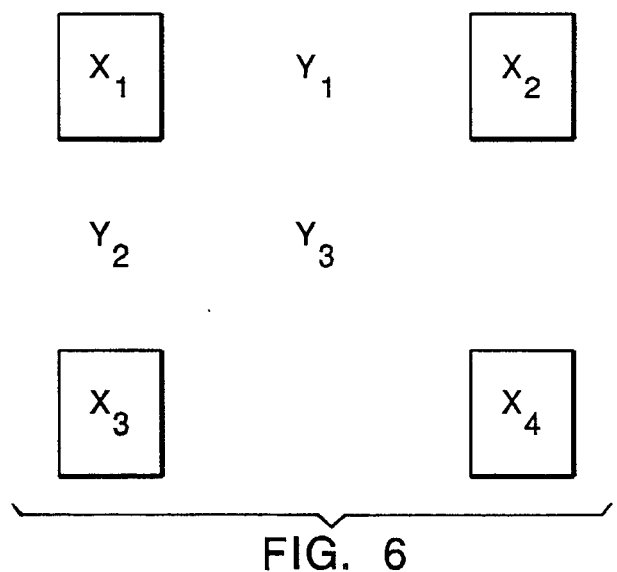
FIG. 6 illustrates the relative X,Y position of the pixels used in a linear interpolation scheme.
FIG. 7 illustrates the interpolated watermarked BASE image pixel values corresponding to the pixel values of the watermarked BASE image of FIG. 4.

FIG. 5, hereafter referred to as the 4BASE image, shows an image that consists of a 9×9 array of pixels corresponding to the high resolution rendition of FIG. 3. Referring to Box 24 in FIG. 1, the watermarked BASE image in FIG. 4 is interpolated to create a prediction for the 4BASE image. The interpolation scheme used in this example is linear interpolation and is described with reference to FIG. 6. For best system performance the interpolator 24 should match the interpolator 49 (shown in FIGS. 16, 17, and 18). The four pixels in the low-resolution image labeled $X_1$ through $X_4$ are linearly interpolated to create the pixels $Y_1$ through $Y_3$ according to the following relationships:

$$Y_1=(X_1+X_2)/2,$$

$$Y_2=(X_1+X_3)/2,$$

$$Y_3=(X_1+X_2+X_3+X_4)/4,$$

where, in order to insure that the $Y_i$ values are also 8-bit integers, all fractions are rounded to the nearest integer and a fractional value of 0.5 is truncated down, e.g., a value of 58.50 is truncated to the integer value of 58. FIG. 7 illustrates the interpolated watermarked BASE image according to the above interpolation scheme where the boxes highlight the pixels that correspond to the low-resolution image (watermarked BASE image) of FIG. 4. Referring to the subtracter 32, in FIG. 1, the modified 4BASE residual image is formed as the pixel-by-pixel difference of the 4BASE image of FIG. 5 and the interpolated watermarked BASE image of FIG. 7. FIG. 8 illustrates this residual image which is the input to Box 20 in FIG. 1. It can be easily seen that if the residual image of FIG. 8 is stored on the CD storage medium 10 without any quantization, the original 4BASE image can be completely recovered. However, in most applications, to save storage space, the residual image is quantized prior to its storage.

An example of the characteristics of a quantizer used in conjunction with the Kodak Photo CD system is shown in FIG. 10. For this example, if the input to the quantizer is any number in the range of −47 to −255, it will be quantized (clipped) to the value of −48. Using the quantizer in FIG. 10 to quantize the residual image of FIG. 8 results in the quantized residual shown in FIG. 9 which is then entropy encoded (e.g., Huffman encoded) and stored on the CD storage medium 10. As shown in FIG. 2, the 4BASE image is recovered by adding the quantized residual of FIG. 9 to the interpolated watermarked BASE image of FIG. 7. This results in the reconstructed 4BASE image shown in FIG. 11. Due to the errors introduced by the quantizer, the 4BASE image reconstructed in this way is significantly different from the original 4BASE image especially in the regions affected by the watermark. The underlined pixels in FIG. 11 are those that differ from the original 4BASE image of FIG. 5. The standard deviation of the pixel-by-pixel error between the original 4BASE image and the reconstructed 4BASE image, also referred to as the root-mean-squared-error (RMSE), is computed to be 63.89. A large portion of this error results from the fact that the quantizer clips the value of any negative residual with a magnitude larger than 48. If this reconstructed 4BASE image is printed with a hard copy device or viewed on a monitor, it would display a visible trace of the watermark.

Figure 12:
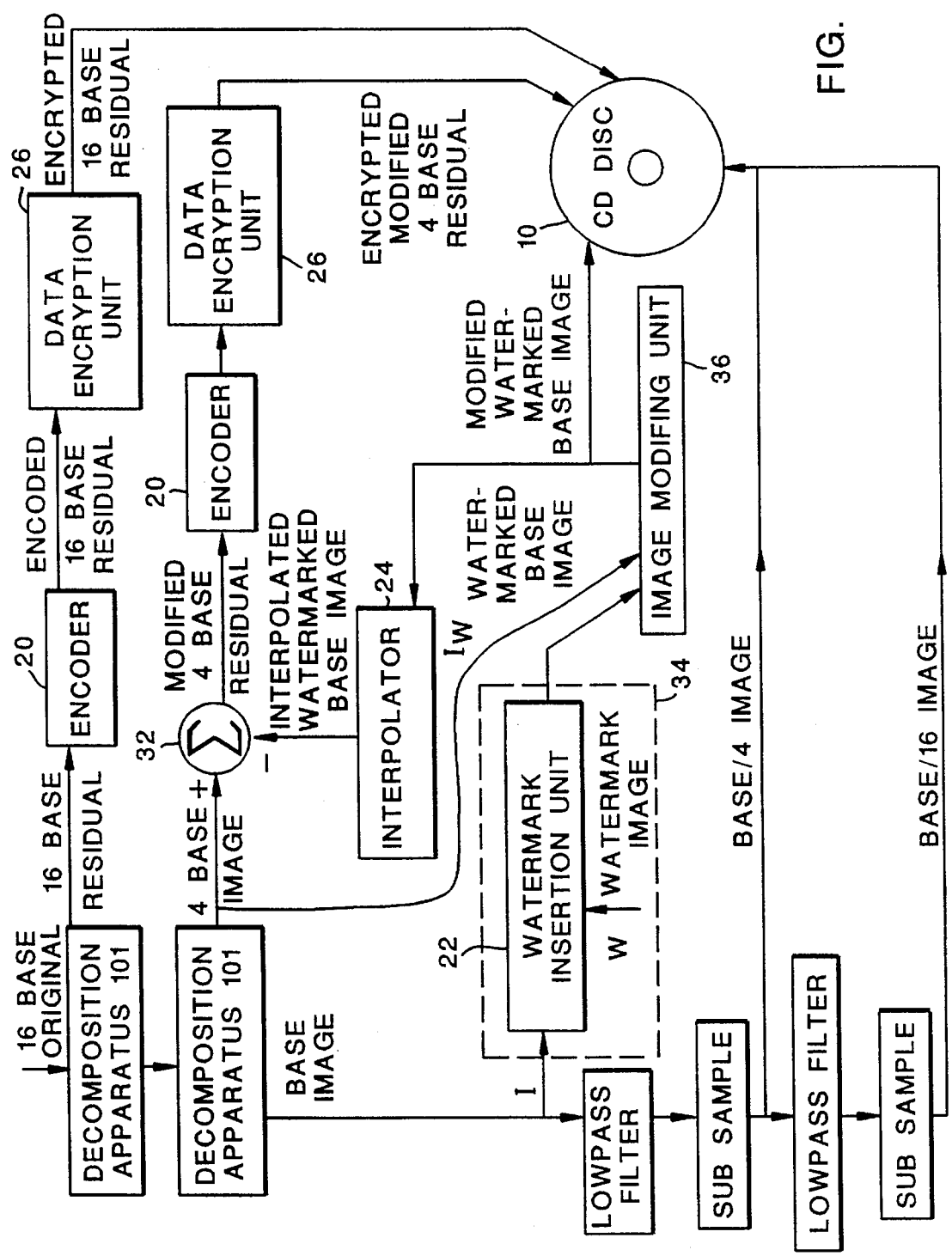
FIG. 12 illustrates the improvement to the PRIOR ART system of FIG. 1.

Referring to FIG. 12, in accordance with the teachings of the present invention, the watermarked low-resolution image $I_W$ at the output of Box 34 is modified in an image modifying unit 36 prior to its interpolation and storage on the CD storage medium in such a way as to reduce the artifacts that result from the quantization of the modified residual in the encoder unit 20. The extent of the modification depends on the characteristics of the quantizer and the watermark. For example, for a fine quantizer which contains many quantization levels, the changes in the visual quality of the watermarked BASE image, as a result of the present invention, will be negligible. On the other hand, if a coarse quantizer with a high degree of clipping is used along with a high-contrast watermark, the changes will be more perceptible and will generally appear as a reduction in the watermark contrast. However, it should be noted that in almost all applications of interest, the benefits of recovering a high quality high-resolution image far outweigh any disadvantages of reducing the watermark contrast.

The present invention introduces a method whereby the pixel values in a low-resolution image are modified prior to their encoding and storage in order to reduce the quantization artifacts in the higher-resolution image. The objective is to introduce the smallest possible magnitude changes in the low-resolution image pixel values that will also minimize the quantization error in the residual image while maintaining the viewability of the low-resolution image. In this way, the fidelity of the reconstructed high-resolution image can be improved while minimizing any compromises to the image quality of the low-resolution image. In one embodiment of the present invention, this technique can be used to improve the reconstruction quality of a high-resolution image in a hierarchical image storage and retrieval system at the expense of introducing minor changes in the low-resolution image. This is particularly useful for those applications where the image quality of a higher resolution image component is more critical than the image quality of the lower resolution image component.

Figure 13:
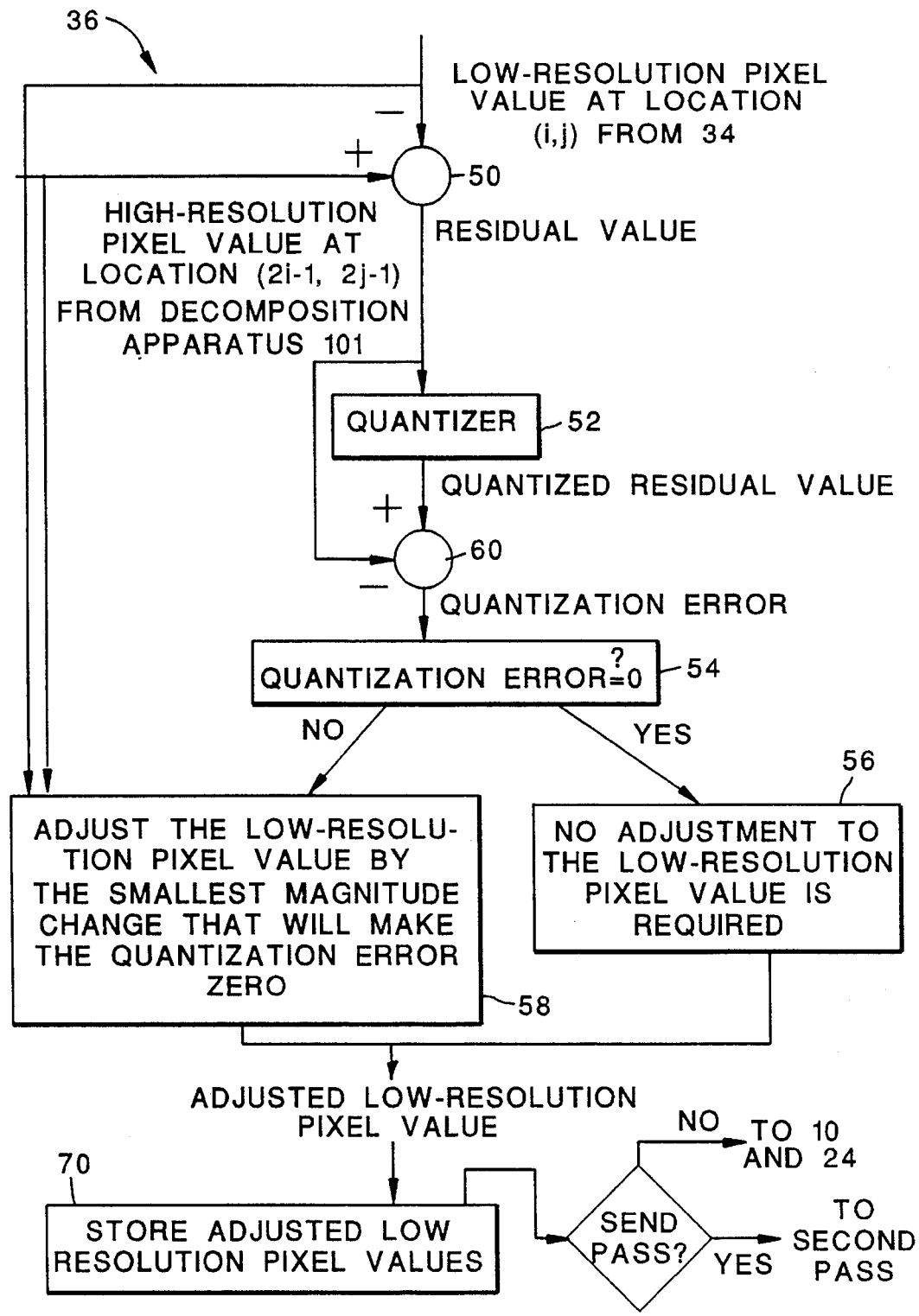
FIG. 13 illustrates, in a flow diagram form, the steps necessary for the adjustment of the values of the low-resolution image pixels during the first pass of the present invention.

Referring to the flow diagram of FIG. 13, which illustrates the functions performed by the image modifying unit 36, the difference (residual) between the value of each pixel in the low-resolution image and the value of its corresponding pixel in the high-resolution image is found. In the Photo CD example, where a high-resolution image has twice as many pixels in each dimension as the low-resolution image, the high-resolution pixel location corresponding to the low-resolution pixel location (i,j) is (2i-1,2j-1) and the difference is found as the output of subtraction operation performed at circle 50. The residual value (difference) from circle 50 is then passed through quantizer 52 to output a quantized residual value. The functional characteristics of a quantizer are shown in the chart of FIG. 10. This value is then compared, in circle 60, against the residual value from circle 50 to determine if an error exists. If it does the low-resolution pixel value is adjusted at function 58, to make the quantization error zero. If no error exists no adjustment is required as stated in block 56. Each low resolution pixel value from 56 or 58 is stored in a storage buffer 70 pending the adjustment of all pixels forming the image. If a second pass is to be implemented it uses the pixel values stored in storage buffer 70. If a second pass is not to be implemented the pixels from storage buffer 70 may be output to the CD 10 and to the interpolator 24.

Figures 14, 15:
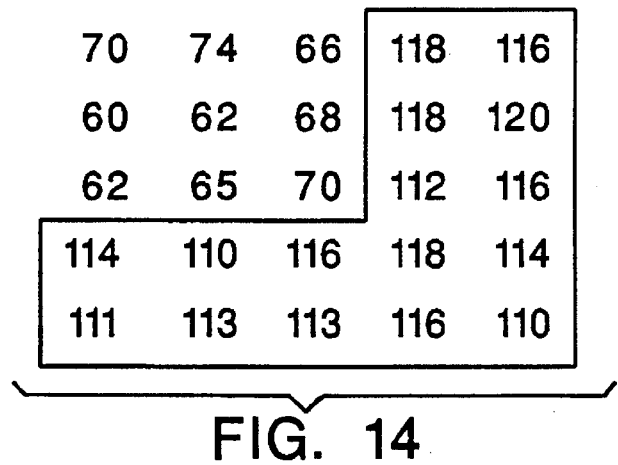
FIG. 14 illustrates the pixel values of a modified watermarked BASE image resulting from a first pass of the present invention.
FIG. 15 illustrates the pixel values of a reconstructed 4BASE image using the pixel values of the modified watermarked BASE image of FIG. 14.

Carrying further the example discussed previously, the residuals between the pixels in the watermarked BASE image of FIG. 4 and their corresponding pixels in the 4BASE image of FIG. 5 are found and adjusted according to the above scheme. The result after a first pass is shown in FIG. 14. For example, the result of subtracting the pixel value in location (1,1) of FIG. 4 from its corresponding pixel value in location (1,1) of FIG. 5 is +1. Referring to the quantizer characteristics of FIG. 10, a residual value of +1 is quantized to the value +1 resulting in no error and thus no adjustment for that pixel. As another example, the result of subtracting the pixel value in location (4,3) of FIG. 4 from its corresponding pixel value in location (7,5) of FIG. 5 is −132 which is quantized to the value −48. The smallest magnitude adjustment to the low-resolution pixel value that will reduce the quantization error to zero is −84. Thus the pixel value in location (4,3) of FIG. 4 is changed from 200 to 116. As is seen from FIG. 14 the effect of this process is to reduce the watermark contrast in the watermarked BASE image. However, the quality of the reconstructed high-resolution image is significantly improved.

FIG. 15 illustrates the reconstructed 4BASE image corresponding to the modified watermarked BASE image of FIG. 14. Again, the underlined pixels differ from the original 4BASE image as a result of the quantization error. The RMSE between the original 4BASE image and the reconstructed 4BASE image of FIG. 15 is 3.09. This constitutes a significant improvement compared to the RMSE of 63.89 corresponding to the reconstructed 4BASE image of FIG. 11. As is seen from FIG. 15, a large portion of this error is due to the three pixels in locations (2,7), (2,8), and (2,9), which have been highlighted in a box. In the present invention, in order to further reduce the quantization error, the low resolution pixel values are adjusted in a second pass which consists of three steps as outlined below. In describing the various steps of the second pass, reference is made to FIG. 6 which illustrates a neighborhood containing the four low-resolution pixels labeled $X_1$ through $X_4$ and the resulting linearly interpolated pixels $Y_1$ through $Y_3$.

Figure 16:
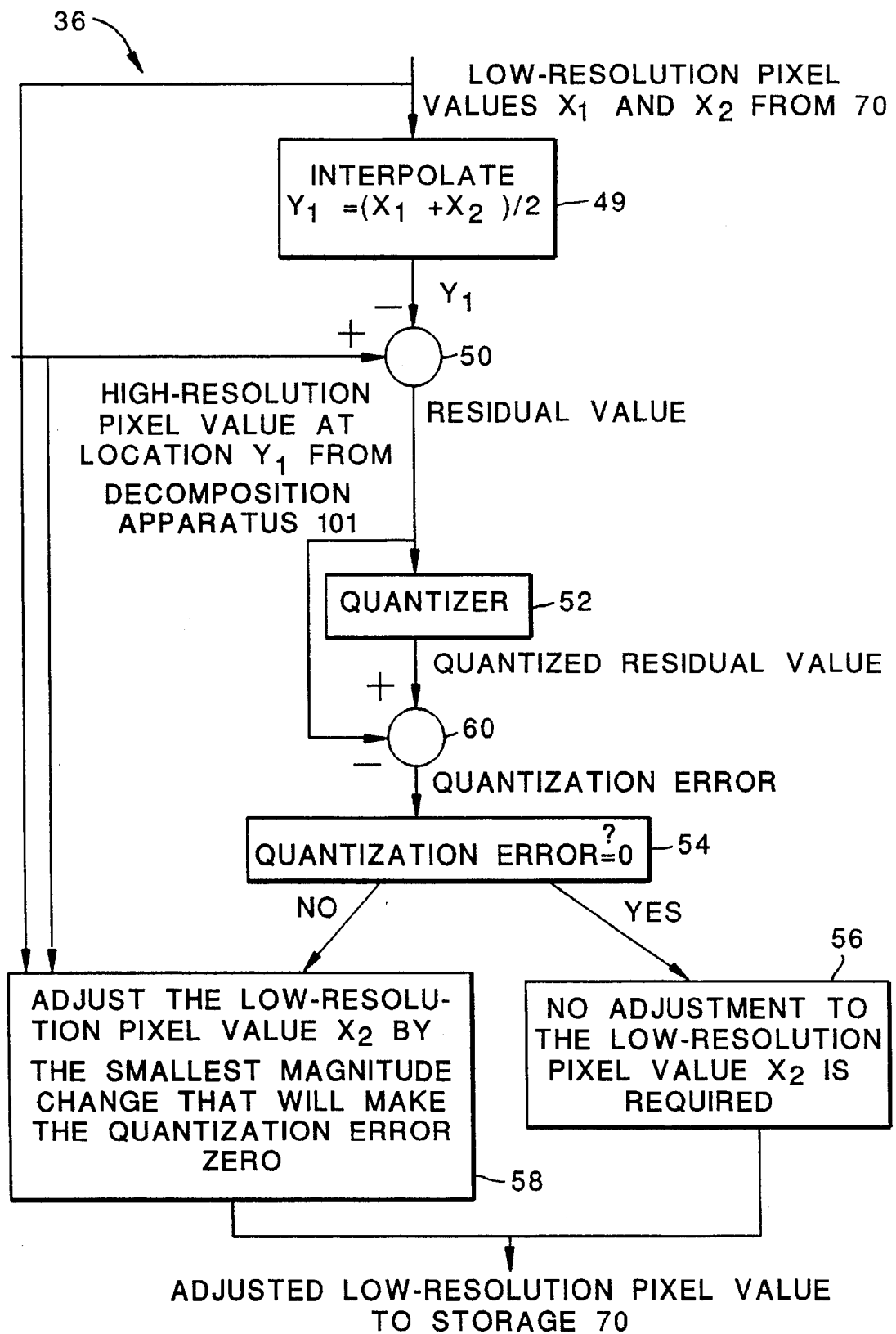
FIG. 16 is a flow diagram of the procedure employed in STEP 1 of the second pass of the present invention to adjust the pixel values of the low-resolution image.

Starting from the top-left pixel of the low-resolution image resulting from the first pass stored in storage buffer 70, and scanning the image from left to right and from top to bottom in a raster fashion, STEP(S) 1, 2 and 3 described below are applied in succession to every pixel in the low-resolution image with the latest adjustment overwriting the previous pixel value in the storage buffer 70:

STEP 1: For a given low-resolution pixel value $X_1$, the interpolated pixel value $Y_1$ is computed according to the interpolation equation and its corresponding residual value is found. The value of the low-resolution pixel $X_2$ (to the right of $X_1$) is then adjusted by the smallest magnitude needed to eliminate the quantization error of that residual. Note that as a result of this adjustment, the residual may sometimes be quantized to a value different from what it was quantized to prior to the adjustment. This is also true for STEP(S) 2 and 3 of the algorithm. A flow diagram describing the procedure employed in STEP 1 is depicted in FIG. 16.

Figure 17:
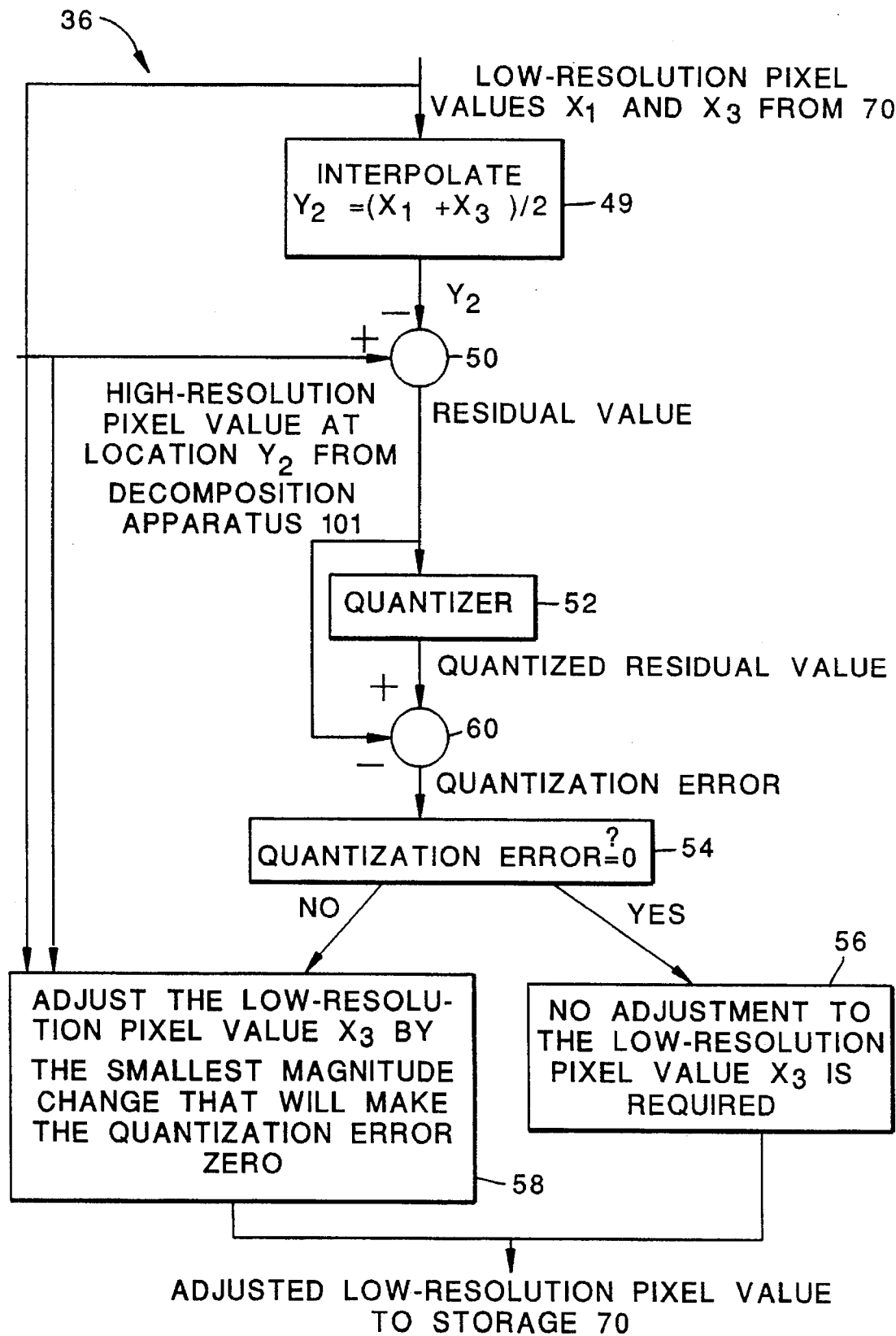
FIG. 17 is a flow diagram of the procedure employed in STEP 2 of the second pass of the present invention to adjust the pixel values of the low-resolution image.
Figure 18:
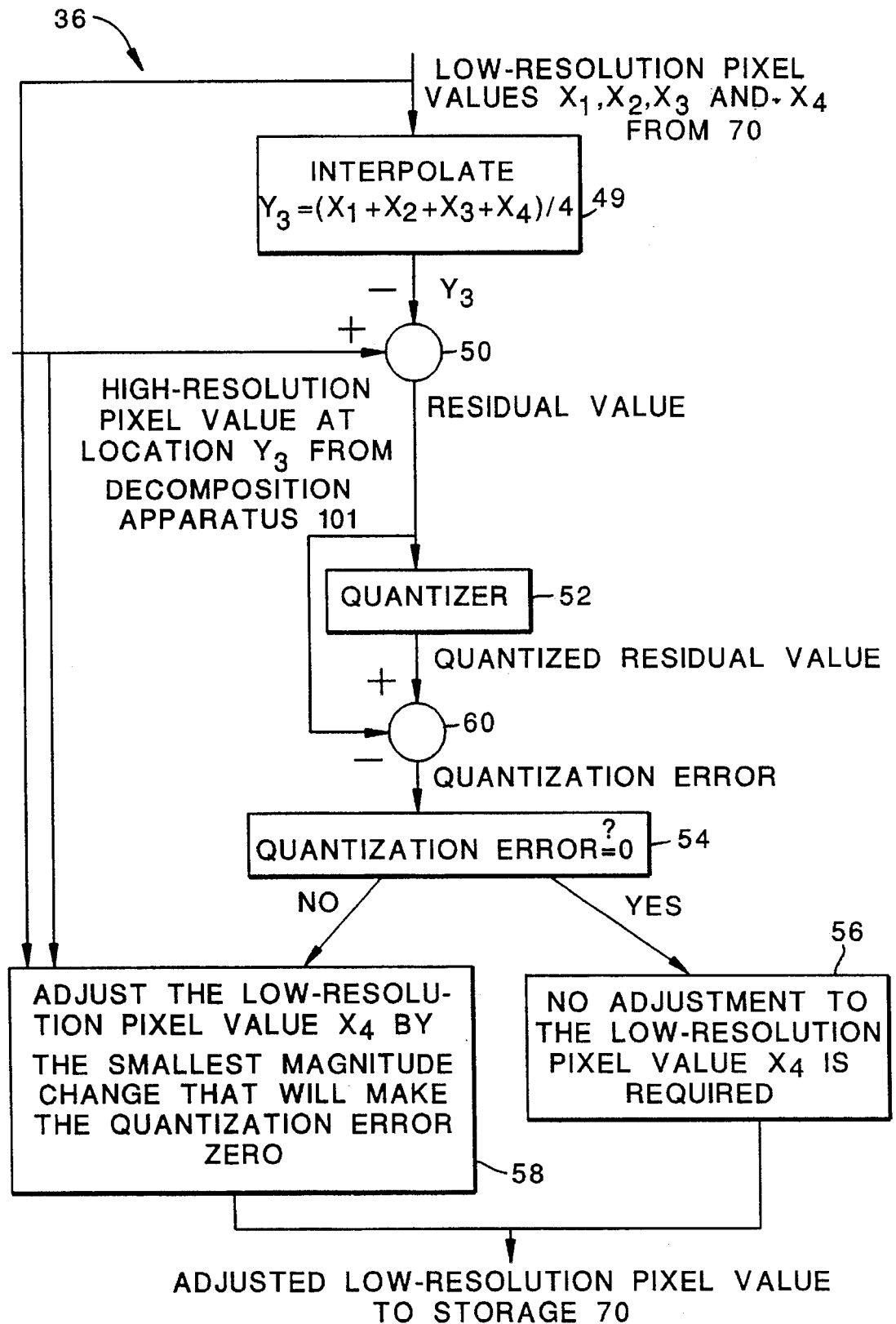
FIG. 18 is a flow diagram of the procedure employed in STEP 3 of the second pass of the present invention to adjust the pixel values of the low-resolution image.

STEP 2: For the same low-resolution pixel value $X_1$ as in STEP 1, the interpolated pixel value $Y_2$ is computed according to the interpolation equation and its corresponding residual value is found. The value of the low resolution pixel $X_3$ (below $X_1$) is then adjusted by the smallest magnitude needed to eliminate the quantization error of that residual. A flow diagram describing the procedure employed in STEP 2 is depicted in FIG. 17.

STEP 3: For the same low-resolution pixel value $X_1$ as in STEP 1, the interpolated pixel value $Y_3$ is computed according to the interpolation equation and its corresponding residual value is found. The value of the low resolution pixel $X_4$ (to the right and below of $X_1$) is then adjusted by the smallest magnitude needed to eliminate the quantization error of that residual. A flow diagram describing the procedure employed in STEP 3 is depicted in FIG. 16.

It should be noted that at any step of the second pass, the calculations are based on the modified low-resolution pixel values that reflect all the adjustments up to that stage. Also, each pixel in the low-resolution image may be adjusted up to three times during the second pass. For those pixels that are located on the image borders, only a part of the neighborhood as defined in FIG. 6 might exist. In such cases, only those steps for which a neighborhood is defined are carried out. The modified low-resolution image after the completion of the second pass would usually generate a very high-quality reconstruction of the high-resolution image.

The application of the second pass of the present invention to the numerical example discussed before will help to illustrate further the operation of each step. Scanning the image of FIG. 14 in a raster fashion, it is found that no adjustment is necessary until the pixel location (1,3) is reached. Denoting the value of this pixel by $X_1$, the value of the interpolated pixel $Y_1$ in STEP 1 is found to be 92. The corresponding high-resolution pixel in FIG. 5 is located at (1,6) and has a value of 70. The residual is thus −22 which results in no quantization error based on the quantizer characteristics of FIG. 10. Similarly, the residual, corresponding to the interpolated value $Y_2$ in STEP 2, is +1 and results in no quantization error. However, the value of $Y_3$ in STEP 3 is found to be 92, which, once subtracted from the value 75 located at position (2,6) in FIG. 5, results in a residual of −17. This residual is quantized to a value of −16, introducing a quantization error of −1. The smallest magnitude adjustment needed to eliminate this quantization error will adjust the pixel value $X_3$, located at (2,4) in FIG. 14, to 119 instead of its current value of 118. After the adjustment, the residual value becomes −16 which is quantized without error. This procedure is continued until all the low resolution pixel values are processed. In this example, the low-resolution pixels that are located at (3,5), (4,2), (4,5), and (5,5), are adjusted three times during the second pass.

Figures 19, 20:
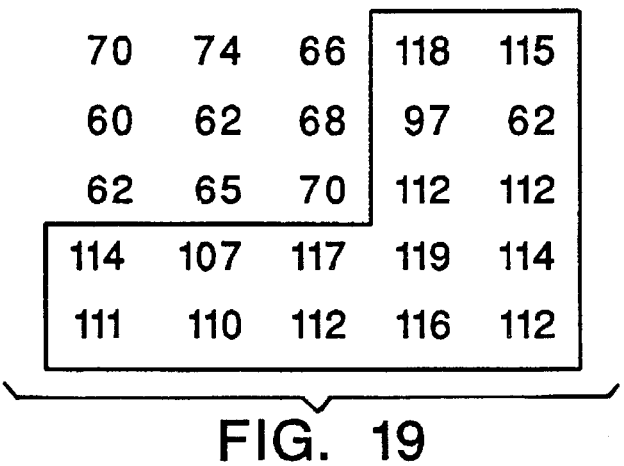
FIG. 19 illustrates the pixel values of a modified watermarked BASE image resulting from a second pass of the present invention.
FIG. 20 illustrates the pixel values of a reconstructed 4BASE image using the watermarked BASE image of FIG. 19.

Proceeding with the example, the completion of the second pass results in the modified watermarked BASE image of FIG. 19. Note that while most pixel values in FIG. 19 have undergone minor adjustments compared to their corresponding values in FIG. 14, the two pixels in locations (2,4) and (2,5) have significantly changed. This was necessary to reduce the large quantization error on the three pixels in the image of FIG. 15 that are enclosed in a box. FIG. 20 shows the reconstructed 4BASE image corresponding to the modified watermarked BASE image of FIG. 19. Again, the underlined pixels differ from the original 4BASE image as a result of the quantization error. It can be seen that all the pixel values in FIG. 20 are within one unit or less of their corresponding value in the original 4BASE image of FIG. 5 except for the pixel located at (9,9), which shows a difference of 2 units. The RMSE between the original 4BASE image and the reconstructed 4BASE image of FIG. 20 is only 0.54, indicating the significant improvement resulting from the second pass.

The high-resolution image, resulting from the present invention (FIG. 20), compared with the PRIOR ART image of FIG. 11, represents a significant improvement. The price paid for this significant improvement is the replacement of the watermarked BASE image of FIG. 4 with the modified watermarked BASE image of FIG. 19 which has a reduced watermark contrast. In most practical applications, the slight compromise in the usefulness of the low-resolution image component is far outweighed by the image quality improvements in the high-resolution image.

The two-pass algorithm described above constitutes a preferred method for achieving the objectives of the present invention, namely, finding the smallest possible magnitude changes in the low-resolution image pixel values that also aim at minimizing the quantization error in the residual image. It should be noted that several variations to this main theme are possible. In general, based on simulations with the Photo CD image storage and retrieval system, it was found that the preferred method resulted in a slightly better high-resolution image quality (for the same degree of modification in the low-resolution image) compared to the other variations. However, in some applications, other system considerations might make the use of the alternative approaches more attractive. In what follows, a few of these variations are briefly described with reference to the preferred method.

In one variation, only the first pass of the algorithm, as described above, is implemented to create a reasonably high-quality, high-resolution image and the second pass is omitted to reduce the computational complexity. In another variation, the first and the second passes are combined into a single pass in the following way. Starting from the top-left pixel of the low-resolution image, the value of the pixel $X_1$ is first modified according to the teachings in the first pass of the preferred method. Next, the values of the pixels $X_2$, $X_3$, and $X_4$ are modified according to the STEP(S) 1–3 of the second pass. Scanning the image from left to right and from top to bottom, this procedure is repeated for every pixel in the low-resolution image. The value of each pixel can be modified up to four times according to this procedure. However, since the order in which the adjustment takes place is different from the preferred method, in general, a different image will result. In yet another variation, the first pass is implemented as described in the preferred method, but the three steps in the second pass are implemented as three separate passes. That is, starting from the top-left pixel of the low-resolution image, the image is scanned from left to right and top to bottom and the STEP 1 of the second pass is applied to all the pixels. Then, the same procedure is followed for STEP 2. Finally, STEP 3 is implemented in a similar fashion. Again, this results in a different order in which the various pixels are processed. In yet another variation, after the execution of the first pass as described in the preferred method, the three steps in the second pass are carried out, but at each step, instead of adjusting the values of the pixels $X_2$, $X_3$, or $X_4$, the value of the pixel $X_1$ is modified. Again, this will result in a different order of modifying the low-resolution pixel values than any of the schemes described before.

Finally, while there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

Parts List:
10 CD Storage Media
20 Encoder
22 Watermark insertion unit
24 Interpolator
26 Data encryption unit
28 Data encryption unit
30 Decoder
32 Subtracter
34 Box
36 Image modifying unit
49 Interpolator
50 Circle
52 Quantizer
56 Block
58 Function
60 Circle
70 Storage buffer
101 Decomposition apparatus
201 Reconstruction apparatus
I BASE image
$I_W$ Watermarked BASE image
W Watermark

I claim:

1. A method for reducing quantization artifacts in a hierarchical image system of the type that decomposes a high resolution image into low resolution image components, including low resolution image pixel values, and residual image pixel values comprising the steps of:

a) forming a predicted higher resolution image by interpolating the pixel values of the low resolution image components;

b) determining the difference values between the pixel values in the low resolution image and the corresponding pixel values in the higher resolution image;

c) comparing each of the difference values against quantizer conversion values to determine if an error would exist for an executed conversion;

d) adjusting the image pixel values within the low resolution image component if an error would exist, to a value that eliminates the error to form an adjusted low resolution image;

e) using the unadjusted image pixel value as part of the adjusted low resolution image component if an error does not exist; and f) forming a predicted higher resolution image by interpolating the pixel values of the adjusted low resolution image components of steps d) and e);

g) determining the difference values between the interpolated pixel values in the predicted higher resolution image and the corresponding pixel values in the higher resolution image;

h) comparing each of the difference values against quantizer conversion values to determine if an error would exist for an executed conversion;

i) adjusting further the image pixel values within the adjusted low resolution image component if an error would exist, to a value that eliminates the error to form an adjusted low resolution image; and j) using the unadjusted image pixel value as part of the adjusted low resolution image component if an error does not exist.

2. A method for reducing quantization artifacts in a hierarchical image system of the type that decomposes a high resolution image into low resolution image pixel values and residual image pixel values comprising the steps of:

a) forming a predicted higher resolution image by interpolating the pixel values of the low resolution image components;

b) computing a predicted value for the high-resolution pixel value being processed from the to be adjusted low-resolution image using interpolation;

c) determining the difference value between the predicted value from the low-resolution image and the corresponding pixel value in the higher resolution image;

d) comparing the difference value against quantizer conversion values to determine if an error would exist for an executed conversion;

e) adjusting a pixel value in the low-resolution image to a value that eliminates the error to form an adjusted low resolution image if an error exists; and making no adjustment if an error does not exist; and f) repeating steps b) through e) for all the pixels in the high-resolution image;

3. A method for reducing quantization artifacts in a hierarchical image system of the type that decomposes a high resolution image into low resolution image pixel values and residual image pixel values comprising the steps of:

a) sequentially forming a predicted higher resolution image by interpolating the pixel values of a first block of low resolution image pixel values;

b) determining the difference value between the pixel values in the predicted higher resolution image and the corresponding pixel value in the higher resolution image;

c) comparing the difference value against quantizer conversion values to determine if an error would exist for an executed conversion;

d) adjusting the image pixel value within the low resolution image component if an error would exist, to a value that eliminates the error to form an adjusted low resolution image;

e) using the image pixel value as part of the adjusted low resolution image component if an error does not exist; and f) repeating steps b) through e) for each pixel value in the higher resolution image.

4. A method for reducing quantization artifacts in a hierarchical image system of the type that decomposes a high resolution image into low resolution image pixel values and residual image pixel values comprising the steps of:

a) applying pixel values to pixel positions within a low resolution image to form a low resolution image component;

b) sequentially forming a predicted higher resolution image by interpolating the pixel values of a first block of the low resolution image components;

c) determining the difference value between the pixel value in the predicted higher resolution image and the corresponding pixel value in the higher resolution image;

d) comparing the difference values against established conversion values to determine if an error would exist for an executed conversion;

e) adjusting the image pixel value within the low resolution image component if an error would exist, to a value that eliminates the error to form an adjusted low resolution image;

f) using the image pixel value as part of the adjusted low resolution image component if an error does not exist; and g) repeating steps b) through f) for each pixel value in the higher resolution image.

5. Apparatus for reducing quantization artifacts in a hierarchical image system of the type that decomposes a high resolution image into low resolution image pixel values, and residual image pixel values, comprising:

means for applying pixel values to pixel positions within the low resolution image to form a low resolution image component;

means for determining the difference values between the pixel values in the low resolution image component and the corresponding pixel values in the higher resolution image;

means for comparing each of the difference values against quantizer conversion values to determine if an error would exist for an executed conversion;

means for adjusting the image pixel values within the low resolution image component if an error would exist, to a value that eliminates the error to form an adjusted low resolution image component and using the image pixel value as part of the adjusted low resolution image component if an error does not exist; and means for forming a predicted higher resolution image by interpolating the pixel values of the adjusted low resolution image component;

means for determining the difference values between the interpolated pixel values in the predicted higher resolution image and the corresponding pixel values in the higher resolution image;

means for comparing each of the difference values against quantizer conversion values to determine if an error would exist for an executed conversion;

means for adjusting the image pixel values within the adjusted low resolution image component if an error would exist, to a value that eliminates the error to form a twice adjusted low resolution image component; and means for using the image pixel value as part of the twice adjusted low resolution image component if an error does not exist.

6. Apparatus for reducing quantization artifacts in a hierarchical image system of the type that decomposes a high resolution image into low resolution image components and residual image components comprising:

means for sequentially forming a predicted higher resolution image by interpolating the pixel values of a first block of the low resolution image components;

means for determining the difference value between the pixel value in the predicted higher resolution image and the corresponding pixel value in the higher resolution image;

means for comparing the difference values against established conversion values to determine if an error would exist for an executed conversion;

means for adjusting an image pixel value within the low resolution image component if an error would exist, to a value that eliminates the error to form an adjusted low resolution image;

means for using the image pixel value as part of the adjusted low resolution image component if an error does not exist; and means for controlling said means for sequentially forming so as to form blocks for all of the pixels of the high resolution image.

7. A method for reducing quantization artifacts in a hierarchical image system of the type that decomposes a high resolution image into low resolution image pixel values and residual image pixel values and applies a watermark to the low resolution image pixel values comprising the steps of:

a) applying watermark pixel values to pixel positions within the low resolution image to form a watermarked low resolution image component;

b) determining the difference values between the pixel values in the watermarked low resolution image and the corresponding pixel values in the higher resolution image;

c) comparing each of the difference values against quantizer conversion values to determine if an error would exist for an executed conversion;

d) adjusting the watermark image pixel values within the watermarked low resolution image component if an error would exist, to a value that eliminates the error to form an adjusted watermarked low resolution image; and e) using the watermark image pixel value as part of the adjusted watermarked low resolution image component if an error does not exist.

8. A method for reducing quantization artifacts in a hierarchical image system of the type that decomposes a high resolution image into low resolution image pixel values and residual image pixel values and applies a watermark to the low resolution image pixel values comprising the steps of:

a) applying watermark pixel values to pixel positions within the low resolution image to form a watermarked low resolution image component;

b) determining the difference values between the pixel values in the watermarked low resolution image and the corresponding pixel values in the higher resolution image;

c) comparing each of the difference values against quantizer conversion values to determine if an error would exist for an executed conversion;

d) adjusting the watermark image pixel values within the watermarked low resolution image component if an error would exist, to a value that eliminates the error to form an adjusted watermarked low resolution image;

e) using the watermark image pixel value as part of the adjusted watermarked low resolution image component if an error does not exist; and f) forming a predicted higher resolution image by interpolating the pixel values of the adjusted watermarked low resolution image components of steps d) and e);

g) determining the difference values between the interpolated pixel values in the predicted higher resolution image and the corresponding pixel values in the higher resolution image;

h) comparing each of the difference values against quantizer conversion values to determine if an error would exist for an executed conversion;

i) adjusting further the watermark image pixel values within the adjusted watermarked low resolution image component if an error would exist, to a value that eliminates the error to form an adjusted watermarked low resolution image; and j) using the watermark image pixel value as part of the adjusted watermarked low resolution image component if an error does not exist.

9. A method for reducing quantization artifacts in a hierarchical image system of the type that decomposes a high resolution image into low resolution image pixel values and residual image pixel values and applies a watermark to the low resolution image pixel values comprising the steps of:

a) applying watermark pixel values to pixel positions within the low resolution image to form a watermarked low resolution image component;

b) computing a predicted value for the high-resolution pixel value being processed from the to be adjusted watermarked low-resolution image using interpolation;

c) determining the difference value between the predicted value from the low-resolution watermarked image and the corresponding pixel value in the higher resolution image;

d) comparing the difference value against quantizer conversion values to determine if an error would exist for an executed conversion;

e) adjusting a pixel value in the low-resolution watermarked image to a value that eliminates the error to form an adjusted watermarked low resolution image if an error exists; and making no adjustment if an error does not exist; and f) repeating steps b) through e) for all the pixels in the high-resolution image;

10. A method for reducing quantization artifacts in a hierarchical image system of the type that decomposes a high resolution image into low resolution image pixel values and residual image pixel values and applies a watermark to the low resolution image pixel values comprising the steps of:

a) applying watermark pixel values to pixel positions within the low resolution image to form a watermarked low resolution image component;

b) sequentially forming a predicted higher resolution image by interpolating the pixel values of a first block of the watermarked low resolution image components;

c) determining the difference value between the pixel value in the predicted higher resolution image and the corresponding pixel value in the higher resolution image;

d) comparing the difference value against quantizer conversion values to determine if an error would exist for an executed conversion;

e) adjusting the watermark image pixel value within the watermarked low resolution image component if an error would exist, to a value that eliminates the error to form an adjusted watermarked low resolution image;

f) using the watermark image pixel value as part of the adjusted watermarked low resolution image component if an error does not exist; and g) repeating steps b) through f) for each pixel value in the higher resolution image.

11. A method for reducing quantization artifacts in a hierarchical image system of the type that decomposes a high resolution image into low resolution image pixel values and residual image pixel values and applies a watermark to the low resolution image pixel values comprising the steps of:

a) applying watermark pixel values to pixel positions within the low resolution image to form a watermarked low resolution image component;

b) sequentially forming a predicted higher resolution image by interpolating the pixel values of a first block of the watermarked low resolution image components;

c) determining the difference value between the pixel value in the predicted higher resolution image and the corresponding pixel value in the higher resolution image;

d) comparing the difference values against established conversion values to determine if an error would exist for an executed conversion;

e) adjusting the watermark image pixel value within the watermarked low resolution image component if an error would exist, to a value that eliminates the error to form an adjusted watermarked low resolution image;

f) using the watermark image pixel value as part of the adjusted watermarked low resolution image component if an error does not exist; and g) repeating steps b) through f) for each pixel value in the higher resolution image.

12. Apparatus for reducing quantization artifacts in a hierarchical image system of the type that decomposes a high resolution image into low resolution image pixel values and residual image pixel values and applies a watermark to the low resolution image pixel values comprising:

means for applying watermark pixel values to pixel positions within the low resolution image to form a watermarked low resolution image component;

means for determining the difference values between the pixel values in the watermarked low resolution image and the corresponding pixel values in the higher resolution image;

means for comparing each of the difference values against quantizer conversion values to determine if an error would exist for an executed conversion; and means for adjusting the watermark image pixel values within the watermarked low resolution image component if an error would exist, to a value that eliminates the error to form an adjusted watermarked low resolution image component and using the watermark image pixel value as part of the adjusted watermarked low resolution image component if an error does not exist.

13. Apparatus for reducing quantization artifacts in a hierarchical image system of the type that decomposes a high resolution image into low resolution image pixel values and residual image pixel values and applies a watermark to the low resolution image pixel values comprising:

means for applying watermark pixel values to pixel positions within the low resolution image to form a watermarked low resolution image component;

means for determining the difference values between the pixel values in the watermarked low resolution image and the corresponding pixel values in the higher resolution image;

means for comparing each of the difference values against quantizer conversion values to determine if an error would exist for an executed conversion;

means for adjusting the watermark image pixel values within the watermarked low resolution image component if an error would exist, to a value that eliminates the error to form an adjusted low resolution image component and using the watermark image pixel value as part of the adjusted watermarked low resolution image component if an error does not exist; and means for forming a predicted higher resolution image by interpolating the pixel values of the adjusted watermarked low resolution image;

means for determining the difference values between the interpolated pixel values in the predicted higher resolution image and the corresponding pixel values in the higher resolution image;

means for comparing each of the difference values against quantizer conversion values to determine if an error would exist for an executed conversion;

means for adjusting the watermark image pixel values within the adjusted watermarked low resolution image component if an error would exist, to a value that eliminates the error to form a twice adjusted watermarked low resolution image component; and means for using the watermark image pixel value as part of the twice adjusted watermarked low resolution image component if an error does not exist.

14. Apparatus for reducing quantization artifacts in a hierarchical image system of the type that decomposes a high resolution image into low resolution image components and residual image components and applies a watermark to the low resolution image components comprising:

means for applying watermark pixel values to pixel positions within the low resolution image to form a watermarked low resolution image component;

means for sequentially forming a predicted higher resolution image by interpolating the pixel values of a first block of the watermarked low resolution image components;

means for determining the difference value between the pixel value in the predicted higher resolution image and the corresponding pixel value in the higher resolution image;

means for comparing the difference values against established conversion values to determine if an error would exist for an executed conversion;

means for adjusting the watermark image pixel value within the watermarked low resolution image component if an error would exist, to a value that eliminates the error to form an adjusted watermarked low resolution image;

means for using the watermark image pixel value as part of the adjusted watermarked low resolution image component if an error does not exist; and means for controlling said means for sequentially forming so as to form blocks for all of the pixels of the high resolution image.

* * * * *